(12) United States Patent
 Toren

(10) Patent No.: US 11,721,336 B1
(45) Date of Patent: Aug. 8, 2023

(54) MESSAGING SYSTEM FOR A VIRTUAL ASSISTANT

(71) Applicant: messageLOUD Inc., New York, NY (US)

(72) Inventor: Garin Toren, New York, NY (US)

(73) Assignee: messageLOUD Inc., Tenafly, NJ (US)

( * ) Notice: Subject to any disclaimer, the term of this patent is extended or adjusted under 35 U.S.C. 154(b) by 243 days.

(21) Appl. No.: 16/932,019

(22) Filed: Jul. 17, 2020

Related U.S. Application Data

(60) Provisional application No. 63/019,124, filed on May 1, 2020, provisional application No. 63/014,577, filed on Apr. 23, 2020, provisional application No. 62/961,958, filed on Jan. 16, 2020, provisional application No. 62/939,516, filed on Nov. 22, 2019.

(51) Int. Cl.
| | |
|---|---|
| *H04L 51/224* | (2022.01) |
| *G10L 15/22* | (2006.01) |
| *G06F 3/16* | (2006.01) |
| *G10L 15/26* | (2006.01) |
| *H04L 51/04* | (2022.01) |
| *H04L 51/42* | (2022.01) |
| *H04L 67/60* | (2022.01) |

(52) U.S. Cl.
CPC .............. *G10L 15/22* (2013.01); *G06F 3/167* (2013.01); *G10L 15/26* (2013.01); *H04L 51/04* (2013.01); *H04L 51/224* (2022.05); *H04L 51/42* (2022.05); *H04L 67/60* (2022.05); *G10L 2015/223* (2013.01)

(58) Field of Classification Search
CPC ......... G06F 3/167; G10L 15/22; G10L 15/26; G10L 2015/223; H04L 51/04; H04L 51/22; H04L 51/24; H04L 67/32

USPC ......................................................... 704/270
See application file for complete search history.

(56) References Cited

U.S. PATENT DOCUMENTS

| | | | |
|---|---|---|---|
| 5,930,700 A * | 7/1999 | Pepper ................... | H04Q 3/005 455/435.3 |
| 7,398,327 B2 * | 7/2008 | Lee ...................... | H04L 67/2838 709/213 |

(Continued)

OTHER PUBLICATIONS

Sandy Writtenhouse, How to enable and use Personal Requests for Siri on HomePod, Feb. 19, 2019 URL https://web.archive.org/web/20190219185251/https://www.idownloadblog.com/2019/02/19/enable-use-personal-requests-homepod/ (Year: 2019).*

*Primary Examiner* — Nafiz E Hoque
(74) *Attorney, Agent, or Firm* — Payam Moradian

(57) ABSTRACT

Messaging with a virtual assistant by: receiving a first request (e.g., spoken by a user to a virtual assistant device hosting the virtual assistant) to check for messages received by an electronic device and transmitting the first request to a backend server for processing. The backend server requests data associated with the messages from the electronic device and, upon receiving the data, generates a response to the first request based on the received data. The backend server then transmits the response to the virtual assistant and the virtual assistant communicates the response (e.g., using audio produced by the virtual assistant device). The virtual assistant receives a reply from the user to the message. The reply is transmitted to the backend server for processing. The backend server transmits the reply to the electronic device which automatically transmits the reply to a recipient of the reply (e.g., a sender of the message).

20 Claims, 10 Drawing Sheets

(56) References Cited

U.S. PATENT DOCUMENTS

| | | | | |
|---|---|---|---|---|
| 7,738,411 | B2* | 6/2010 | Koponen | H04W 12/06 |
| | | | | 455/411 |
| 9,973,461 | B2* | 5/2018 | Tomlinson | H04L 51/34 |
| 10,261,830 | B2* | 4/2019 | Gupta | G06F 9/5072 |
| 10,277,728 | B1 | 4/2019 | Toren | |
| 10,956,666 | B2* | 3/2021 | Vescovi | G06Q 10/06311 |
| 11,218,429 | B2* | 1/2022 | Yun | H04L 51/16 |
| 11,516,221 | B2* | 11/2022 | Alsina | G06F 3/167 |
| 2002/0085511 | A1* | 7/2002 | Koponen | H04M 1/72412 |
| | | | | 370/315 |
| 2005/0114534 | A1* | 5/2005 | Lee | H04L 67/2838 |
| | | | | 709/230 |
| 2009/0063353 | A1* | 3/2009 | Viidu | G06Q 20/16 |
| | | | | 705/40 |
| 2010/0327054 | A1* | 12/2010 | Hammad | G06F 21/42 |
| | | | | 235/375 |
| 2013/0080918 | A1* | 3/2013 | Bouzid | G06F 16/972 |
| | | | | 715/753 |
| 2014/0189808 | A1* | 7/2014 | Mahaffey | H04L 63/0853 |
| | | | | 726/4 |
| 2015/0326510 | A1* | 11/2015 | Tomlinson | H04L 51/04 |
| | | | | 709/206 |
| 2017/0132019 | A1* | 5/2017 | Karashchuk | H04L 51/046 |
| 2017/0132199 | A1* | 5/2017 | Vescovi | G06F 3/04842 |
| 2017/0357534 | A1* | 12/2017 | Gupta | G06F 9/4881 |
| 2017/0357965 | A1* | 12/2017 | Knopp | G06Q 20/385 |
| 2017/0359313 | A1* | 12/2017 | Livneh | H04W 12/02 |
| 2018/0262456 | A1* | 9/2018 | Tomlinson | H04L 51/18 |
| 2018/0341937 | A1* | 11/2018 | Kim | G06Q 20/3829 |
| 2019/0132321 | A1* | 5/2019 | Pitchaimani | H04L 63/102 |
| 2019/0158433 | A1* | 5/2019 | Yun | G10L 17/22 |
| 2020/0311729 | A1* | 10/2020 | Matthews | G06Q 20/322 |
| 2021/0110106 | A1* | 4/2021 | Vescovi | G06Q 10/101 |

\* cited by examiner

MESSAGING SYSTEM FOR A VIRTUAL ASSISTANT

CROSS-REFERENCE TO RELATED APPLICATIONS

This application claims the benefit of priority to U.S. provisional application Ser. No. 62/939,516, filed on Nov. 22, 2019, U.S. provisional application Ser. No. 62/961,958, filed on Jan. 16, 2020, U.S. provisional application Ser. No. 63/014,577 filed on Apr. 23, 2020, and U.S. provisional application Ser. No. 63/019,124, filed on May 1, 2020, the contents of each of which are hereby incorporated by reference.

TECHNICAL FIELD

The present disclosure relates generally to user access to messages received by an electronic device, and more specifically to utilizing a virtual assistant to assist the user with sending/receiving messages through the electronic device.

BACKGROUND

Many electronic devices (e.g., a smart phone) provide users with the ability to communicate with each other by transmitting and receiving messages. For example, the electronic devices may include texting, e-mail and/or instant messaging capabilities that enable the users to transmit and receive text, images, sounds, etc. The user may interact with these electronic devices in many different ways, such as through mechanical devices (e.g., keyboards, mice, etc.), touch screens, motion and gesture capture, etc. However, another way to interact with electronic devices is through a virtual assistant, e.g., via spoken verbal input.

Using spoken verbal input to interact with electronic devices becomes more complicated when the user attempts to discover, pair, and/or configure a secondary electronic device to be controlled by a primary electronic device that provides functionality for receiving spoken verbal input to control both the primary electronic device and the secondary computing device.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
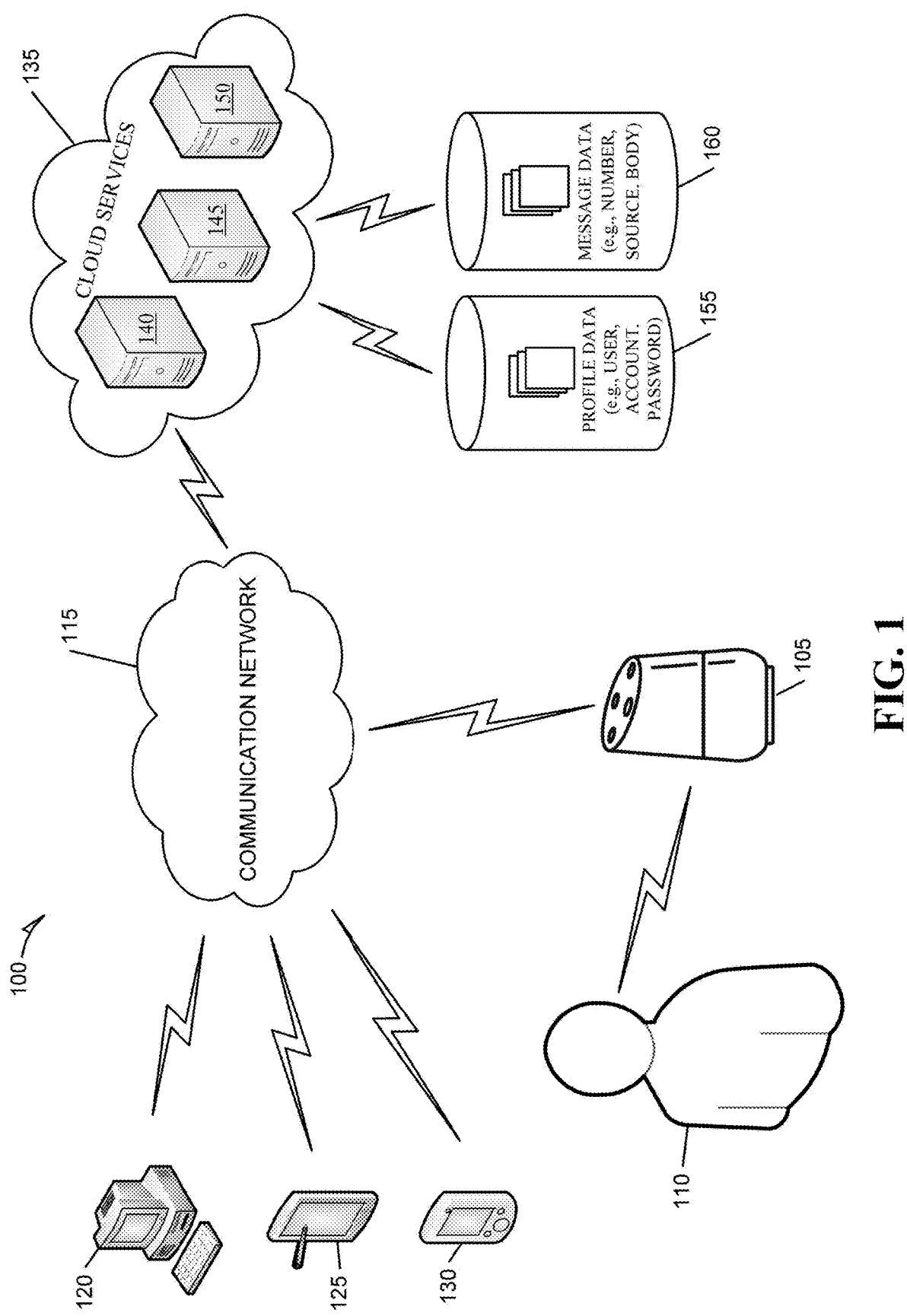
FIG. 1 is a use-case diagram showing a system, consistent with some embodiments, for messaging over a network by using a virtual assistant.

A virtual assistant may take the form of an application, module, software, etc., capable of analyzing input (e.g., verbal input) to identify a user's intent and then provide assistance to the user based on the identified user intent. For example, a virtual assistant may be an application such as ALEXA (made available by Amazon.com Inc., of Seattle Wash.) that converts verbal input to text (e.g., using a voice profile for a known user) and then uses semantic analysis to analyze the text, recognize meaningful terms in the text and then determine the user intent based on data associated with the meaningful terms. A virtual assistant, like ALEXA, may be voice-controlled to assist the user with playing audio, answering questions, engaging the user's favorite services (e.g., a weather application), or even controlling home appliances or other electronic devices (e.g., a smart phone).

SUMMARY

Provided is a computer implemented method to be carried out with a processor and a memory, comprising: a) receiving a message on a first device; b) receiving an instruction to deliver the message via a virtual assistant; c) communicating the message from the first device to a server of the virtual assistant; and d) the virtual assistant then delivering the message to the user. The virtual assistant can communicate the message via a virtual assistant device.

Provided is a computer implemented method to be carried out with a processor and a memory, comprising: a) receiving a message on the first device; b) receiving an instruction to notify the user of the message via a messaging application on the first device; c) receiving a token from the server associated with the virtual assistant; d) matching the user of the virtual assistant and the messaging application based on the token; e) communicating the notification to the server of the virtual assistant; and f) the virtual assistant then delivering the notification(s) to the user via the virtual assistant device (e.g., via a blinking light).

Provided is a computer implemented method to be carried out with a processor and a memory, comprising: a) receiving a message on the first device; b) receiving an instruction to notify the user of the message; c) storing the message (such as for less than 24 hours) to a server associated with the messaging application; d) the virtual assistant then delivering the notification(s) to the user via the virtual assistant device; e) receiving an instruction to deliver the message via the virtual assistant; f) communicating the message to the server of the virtual assistant; and g) the virtual assistant then delivering the message to the user.

Provided is a computer implemented method to be carried out with a processor and a memory, comprising: a) receiving a message on a first device; b) receiving an instruction to deliver the message via the virtual assistant; c) communicating the message to the server of the virtual assistant; d) the virtual assistant then delivering the message to the user based on a request from the user e) receiving a reply message from the user via the virtual assistant; f) communicating the reply message to the server associated with the messaging application; and g) transmitting the reply message to the first device.

Provided is a computer implemented method to be carried out with a processor and a memory, comprising: a)receiving an initial message from the user to a "contact" on the first device via the virtual assistant; b) communicating the initial message to a server associated with the messaging application; c) transmitting the initial message to the first device; and d) transmitting the initial message to a device associated with the contact.

Provided is a computer implemented method to be carried out with a processor and a memory, comprising: a) receiving an instruction from the user to clear any unread messages from the first device; b) communicating the instruction to a server associated with the messaging application; c) transmitting the instruction to the first device; and d) deleting any unread messages on the device.

Provided is a smart phone (or other electronics devices mentioned above), comprising: one or more processors; a memory, a touch screen; one or more programs, wherein the one or more programs are stored in the memory and configured to be executed by the one or more processors, the one or more programs including instructions to carry out the recited steps above.

Provided is a system for delivering one or more of a text message and an email and a message from the messenger application to a user engaged in an activity, the system comprising a processor, a memory, and a touch screen, the system configured to deliver the text message, the message from the messenger application, and the email to the user by carrying out the recited steps above.

System

FIG. 1 is a use-case diagram showing a system 100, consistent with some embodiments, for messaging over a network by using a virtual assistant.

As illustrated in FIG. 1, the frontend of the virtual assistant may be a virtual assistant physical virtual assistant device 105, such as ECHO made available by Amazon.com Inc., of Seattle Wash., or GOOGLE HOME made available by Google LLC of Mountain View Calif. The virtual assistant device 105 may have a microphone and a speaker for receiving verbal input and generating audio output respectively. The virtual assistant device 105 may include a companion virtual assistant application (described below with respect to FIG. 3), which is an application that connects with a virtual assistant backend in the cloud (e.g., a virtual assistant server 140). A user 110 may take an affirmative step to request, typically by voice, that data regarding his or her received messages, typically from her smart phone 130 or other electronic device (e.g., desktop computer 120 or tablet device 125), be provided to the user 110, e.g., read aloud.

In some embodiments, the virtual assistant device 105 may be in a "listening mode" wherein the companion virtual assistant application may be activated based on receiving a particular verbal command, such as "hey google" or "hey Siri" or "Alexa." After the virtual assistant application has been activated, the user 110 may request the virtual assistant application to 1) notify the user 110 regarding any messages received by an electronic device of the user 110 (e.g., smart phone 130), and/or 2) provide data associated with the messages (e.g., number, source, sender, body etc.) to user 110. For example, the data associated with the messages may be read aloud by virtual assistant device 105 in order of receipt of the messages until all of the data has been provided to user 110.

In some embodiments, the emails, text messages, voice messages, voicemail, video messages, and/or messages from other applications are received by the smart phone 130 or other electronic device (e.g., 120, 125, etc.) of user 110 via a communication network 115. For example, the communication network 115 may be the network of a mobile phone carrier or that of an internet carrier. Internet Message Access Protocol (IMAP) may be used as an Application Layer Internet protocol to communicate with a remote mail server to access email. Text messages may be communicated, for example, across the mobile carrier of the user 110 using Short Message Service (SMS), which uses standardized communications protocols to allow mobile smart phone 130 and/or other electronic devices (e.g., 120, 125, etc.) to exchange short text messages. The SMS text message is "short" and may be limited to a number of characters.

In some embodiments, the message type may be based on a source of the message, for example, a messenger service such as Facebook messenger, WhatsApp messenger, Skype messenger, Twitter Direct Messenger, Tango messenger, Viber Messenger, WeChat messenger, Instagram direct messenger, and iMessage (Apple chat). The messenger service is an instant messaging service and software application which provides chat with a friend on electronic devices that include a mobile carrier antenna, such as a mobile smart phone 130. The messenger service may be built, for example, based on the open MQ Telemetry Transport (MQTT) network protocol that transports messages between devices.

In some embodiments, rather than using a dedicated virtual assistant device (e.g., virtual assistant device 105), the virtual assistant may reside on a personal device of user 110, such as a smart watch of user 110 or the smart phone 130 of user 110. However, the virtual assistant may reside on desktop computer 120, tablet device 125, a vehicle operating system and/or home devices/appliances (such as a television, refrigerator, etc.). The user 110 may request the virtual assistant on his smart phone 130 to provide (e.g., read aloud) the message data for messages received at the smart phone 130 itself or at another electronic device (e.g., 125 or 130). The backend methods for processing the request and the messages of user 110 may be implemented in the same manner as described herein with respect to a dedicated virtual assistant hosting device, such as virtual assistant device 105.

In some embodiments, the message request of user 110 may be communicated from the virtual assistant device 105 hosting the virtual assistant application to the cloud (e.g., to virtual assistant server 140 of cloud services 135), which may be Amazon's web service (AWS) or another cloud based service. The message request of user 110 may then be processed (e.g., voice to text and determination of intent of user 110) by the virtual assistant server 140 before being communicated to a separate backend server 145, which may also reside in the cloud (e.g., in cloud services 135). The message request of user 110 may be communicated to the backend server 145 because a "messages" intent was determined for user 110 and backend server 145 hosts a "skill"

which facilitates messaging via the virtual assistant (pingloud skill from messageLOUD Inc.). Accordingly, backend server 145 may be referred to as the "skill backend". In the context of a virtual assistant, a "skill" is like an app for Google Android or Apple IOS, for example, you may have skills developed to utilize the Amazon Alexa infrastructure. The Alexa Skills Kit is a collection of self-service APIs and tools that make it fast and easy for developers to create new voice-driven capabilities (e.g., messaging) for Alexa. For example, if user 110 wanted to book a reservation at a restaurant, the user 110 could simply download a reservation booking skill and then use it to book the reservation. The skill may be hosted by the virtual assistant server 140 so that communication with the backend server 145 is not required.

The communication of the message request from the virtual assistant server 140 to the backend server 145 may also include the communication of a token. A token is a private and/or encrypted key that allows logging into a virtual assistance account of user 110 (e.g., an Amazon/Alexa account) from the backend server 145. The transmitted token may be used to match the same user for two applications as the user 110 logs into the virtual assistant application (e.g., Alexa companion app) hosted by virtual assistant device 105 and a messaging application (e.g., ping app from messageLOUD Inc.) running on a separate electronic device (e.g., smart phone 130) with the same Amazon user account. The token may be used by backend server 145 to get user profile data (e.g., from storage 155) for user 110 as per his/hers Amazon user account. In some embodiments, an access token may be used to initially access Amazon profile data for user 110 and a refresh token may subsequently be used to refresh the token data after a specified time period, which limits the "lifetime" of the originally communicated access token, has expired.

In some embodiments, the token may be communicated from the backend server 145 to a separate third party server 150 which hosts an application (e.g., Firebase from Google) configured to allow for a third party to log into a virtual assistant user account of user 110 from the third-party server 150 based on the token. The Firebase application may provide authentication to improve the sign-in and onboarding experience for end users, like user 110 in system 100. For example, the Firebase application may provide an end-to-end identity solution for system 100 by supporting interaction with email and password accounts, phone authentications, and diverse logins: Google, Twitter, Facebook, GitHub, etc.

In some embodiments, the above noted ping application (which is a messaging management application described, in part, in U.S. Pat. No. 9,591,117 which is incorporated herein by reference in its entirety) running on smart phone 130, may check for newly received (e.g., since they were last checked) messages, and then if there are any, send data associated with the messages (e.g., source, sender, subject, body, etc.) to the skill backend server 145. In some embodiments, the backend server may store the data associated with the messages for later access, for example the message data may be stored in a storage 160 configured to store the message data types. The backend server 145 may then communicate the message data to the virtual assistant server 140 which may host a program like Alexa Voice Service for voice processing (e.g., text to audio). The virtual assistant server 140 may then communicate the processed message data to the virtual assistant device 105 which provides (e.g., reads aloud) the messages.

In some embodiments the messages received at smart phone 130 may be replied to after they have been communicated to user 110 by virtual assistant device 105. Alternatively, the user may generate an initial message (e.g., instead of a reply) to a "contact" of the user on smart phone 130. The virtual assistant device 105 may receive a spoken reply to at least one of the messages received by the smart phone 130, for example, "Please tell Bob that I will meet him for dinner at 8 pm". Therefore, the system 100 might match the reply to the message based on a sender of the message being "Bob" and/or a subject of the message being "dinner". Alternatively the system 100 might match the reply to a contact on smart phone 130 based on a name field of the contact being "Bob". The virtual assistant device 105 may then transmit the spoken reply to the virtual assistant server 140 for voice processing, wherein the voice processing includes generating text based on the reply (or initial message) and then generating an audio version of the reply based on the text. The virtual assistant device 105 may then receive and play the generated audio so that user 110 may listen to the audio and approve of the generated audio version of the reply (or initial message) before it is sent. The virtual assistant device 105 may therefore wait for a spoken acknowledgment user 110 that indicates that the played audio matches the spoken reply. The virtual assistant device 105 may then transmit the text generated based on the reply (or initial message) to backend server 145 based on receiving the acknowledgement.

In some embodiments, the backend server 145 may then transmit data associated with the generated reply (or initial message) text to the smart phone 130. The messaging application (e.g., ping app.) may generate a reply (or initial) message based on the received data associated with the reply text and transmit the reply message to a sender of the at least one message (or a contact), e.g., Bob.

User Interface

Figure 2:
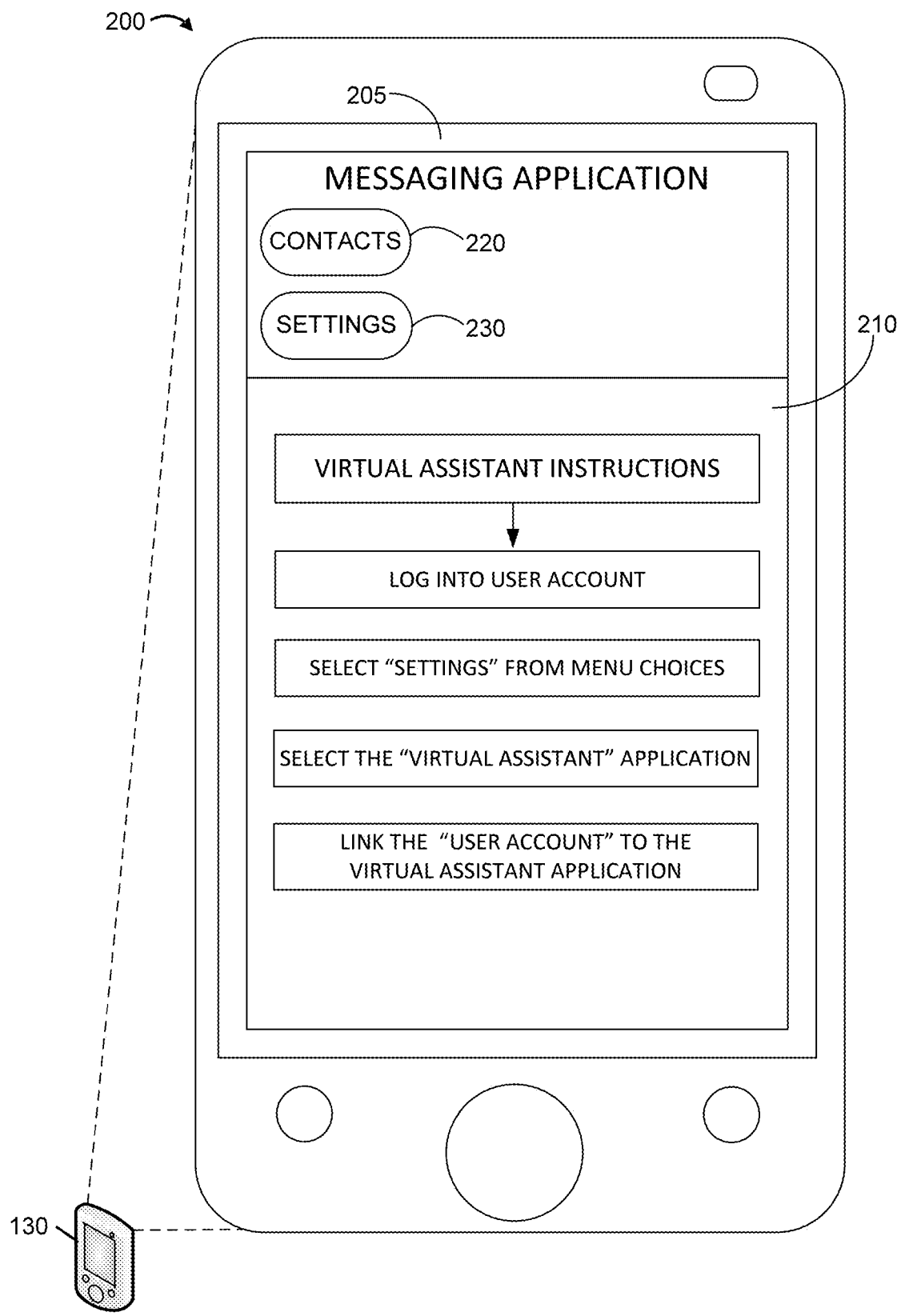
FIG. 2 is a block diagram illustrating an example of a messaging application, consistent with some embodiments, for messaging over a communication network by using a virtual assistant.

FIG. 2 is a block diagram illustrating an example of a messaging application 200, consistent with some embodiments, for messaging over a communication network by using a virtual assistant.

In some embodiments, the messaging application 200 (e.g., ping app from messageLOUD Inc.) may be running on smart phone 130, although as noted above it may be running on another device (e.g., 120, 125, etc.). A display 205 of smart phone 130 may show a user interface 210 (UI) for the messaging application 200. The UI 210 may present the user 110 with graphical menu choices such as a "contacts" choice 220 and a "settings" choice 230. The UI 210 may also present the user 110 with instructions for setting up the messaging application 200 for use in conjunction with the virtual assistant application so that messages received at the smart pone 130 may be accessed via the virtual assistant application. The instructions may be presented based on user 110 having selected an option for instructions to be shown when the messaging application 200 is launched.

In some embodiments, the UI 210 may present the following instructions for using the messaging application 200 together with the virtual assistant application: 1) log into the messaging application 200 with a user account of user 110 (e.g., an Amazon user account); 2) select the menu choice "Settings" 230 of the UI 210; 3) select a settings menu choice for the "Virtual Assistant Application" (e.g., Alexa); and 4) select a menu choice(s) for linking the user account of user 110 (e.g., Amazon account of user 110) to the virtual assistant application.

Figure 3:
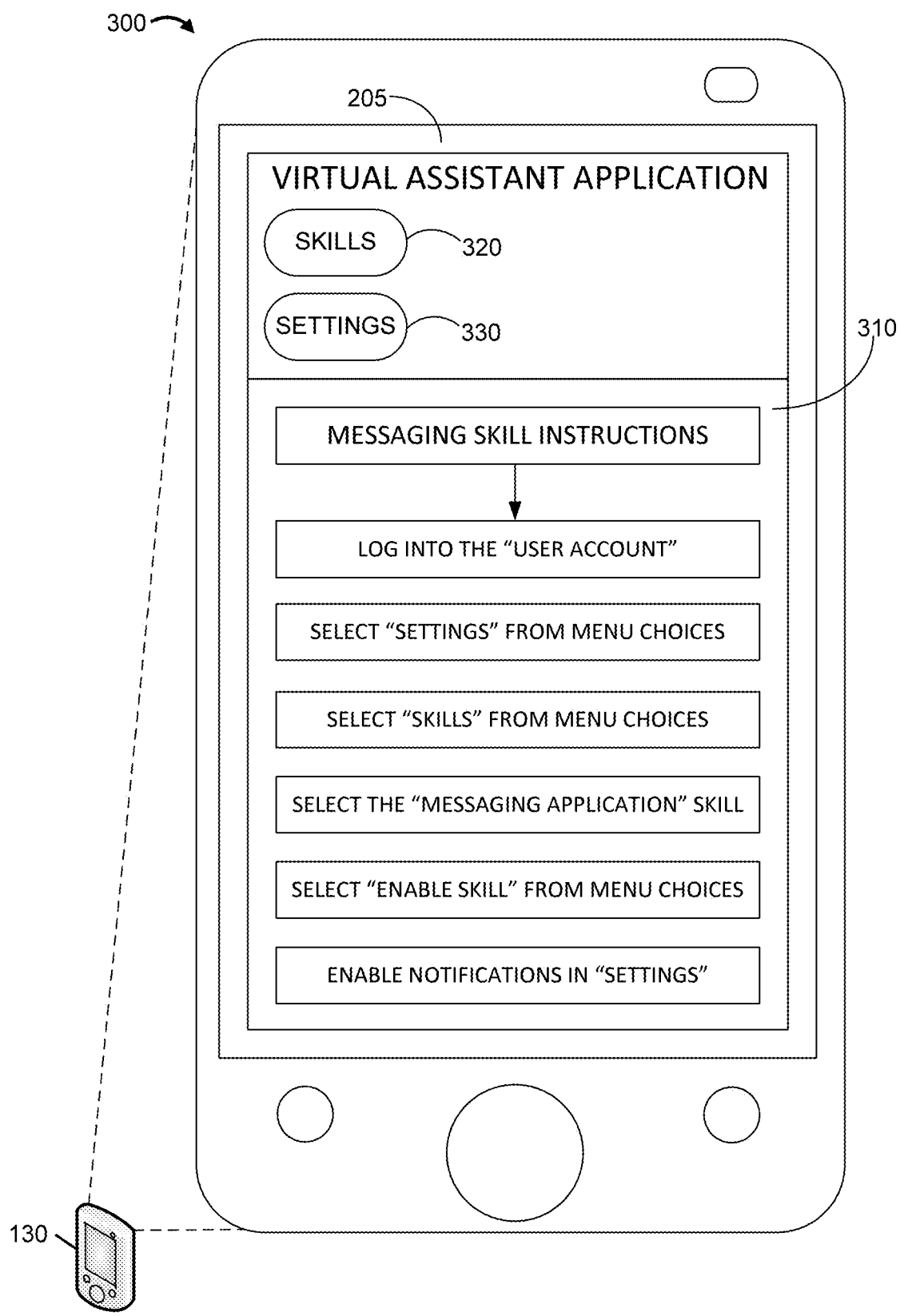
FIG. 3 is a block diagram illustrating an example of a virtual assistant application, consistent with some embodiments, for messaging over a communication network by using a virtual assistant.

FIG. 3 is a block diagram illustrating an example of a virtual assistant application 300, consistent with some embodiments, for messaging over a communication network by using a virtual assistant.

In some embodiments, a UI 310 of the virtual assistant application 300 (e.g., the Alexa companion app) may be accessed via the smart phone 130 of user 110 (or another device: 120, 125, etc.) over the communication network 115 or over a short range connection protocol (e.g., Bluetooth) if the smart phone 130 is physically close enough to the virtual assistant device 105 hosting the virtual assistant application. In some embodiments, the frontend virtual assistant device 105 may have its own display (and/or other controls) through which the user 110 may interact with the UI 310 of the virtual assistant application 300.

The display 205 of smart phone 130 may show the user interface 310 (UI) for the virtual assistant application 300. The UI 310 may present the user 110 with graphical menu choices such as a "skills" choice 320 and a "settings" choice 330. The UI 310 may also present the user 110 with instructions for setting up the virtual assistant application 300 for use in conjunction with the messaging application 200 so that messages received at the smart pone 130 may be accessed via the virtual assistant application 300. As noted above with respect to FIG. 2, the instructions may be presented based on user 110 having selected an option for instructions to be shown when the virtual assistant application 300 is launched.

In some embodiments, the UI 310 may present the following instructions for using the virtual assistant application 300 together with the messaging application 200: 1) log into the virtual assistant application 300 with the user account of user 110 (e.g., the same Amazon user account used to log into messaging application 200); 2) select the menu choice "Settings" 330 of the UI 310; 3) select the menu choice "Skills" 320 of the UI 310; 4) search for and then select a skills menu choice for interacting with the messaging application 200 (e.g., the pingLoud skill); 5) select a skills menu choice for enabling the selected skill (e.g., the pingLoud skill); and, after the skill has been enabled, 6) select a settings menu choice to "Enable Notifications".

Data Flow

Figure 4:
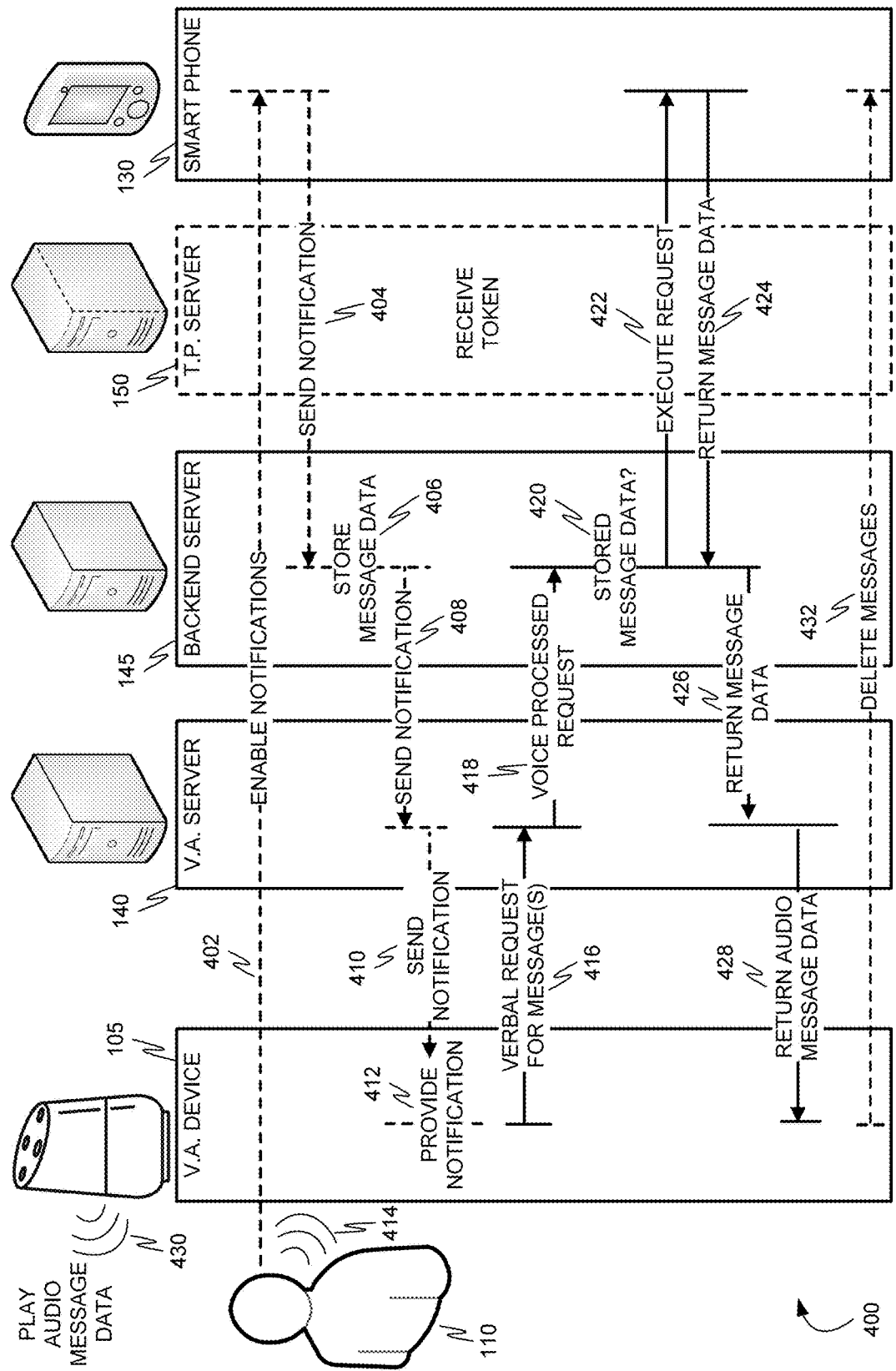
FIG. 4 is a ladder diagram illustrating a method, in accordance with some embodiments, for accessing messages over a network by using a virtual assistant.

FIG. 4 is a ladder diagram illustrating a method 400, as used in some embodiments, for accessing messages over a network by using a virtual assistant.

A system for accessing messages over a network by using a virtual assistant (e.g., system 100 of FIG. 1) may operate in different modes. For example: 1) Message Delivery upon Request: in this mode all newly received texts/emails/messages are aggregated by messaging application 200 (e.g., ping application) and placed in local storage on the smart phone 130 of user 110 (e.g., running the Android operating system by Google). The new messages are passed from smart phone 130 to the virtual assistant server 140 (e.g., backend Alexa AVS) when user 110 asks virtual assistant device 105 (e.g., Echo device) for new messages (e.g., from smart phone 130) to be read aloud. Once read, each message may be deleted from the messaging application 200 local storage. Alternatively, the messages may be deleted from the messaging application 200 local storage before they are even read/heard based on an instruction from the user 110 to do so.

2) Notifications: in this mode (which is optional since the messages may be requested whether or not a notification has been received) all newly received texts/emails/messages are sent to the virtual assistant server 140 in real time (e.g., as they are received by messaging application 200 at smart phone 130) and stored there (e.g., securely encrypted in storage 160) for a limited period of time (e.g., a specified time period). The virtual assistant device 105 (e.g., Echo device or other personal/virtual assistant device) may flash a light to indicate that a notification has been received and is pending. The user 110 may see the flashing light on virtual assistant device 105 and ask it (as in mode 1 above) to provide message data relating to the pending notification (e.g., number, sender, subject, body, etc.).

At operation 402, the user 110 may enable notifications regarding messages received at an electronic device of user 110 (e.g., via messaging application 200 on smart phone 130).

At operation 404, the messaging application 200 on the smart phone 130 may send a notification to backend server 145 based on a message being received.

At operation 406, the backend server 145 may store the message which caused the notification in its own storage (e.g., storage 160) based on the messaging application 200 sending the message together with the notification. The message placed in storage 160 by the backend server 145 may be delivered to the user 110 after a request by the user 110 as described below with respect to operations 420 and 426. In some embodiments, the message may reside in storage 160 in an encrypted format. Enabled notifications may be a parameter that messaging application 200 uses to make a decision on whether to store the received message in local storage (e.g., in smart phone 130) or send the message to backend server 145 in real time. In some embodiments, the stored message may only exist on the backend server 145 (e.g., in storage 160) until it is provided to user 110 or until a pre-determined period of time has expired and it is deleted. As noted above, the messages may be deleted from the messaging application 200 local storage before they are even read/heard based on an instruction from the user 110 to do so, this instruction may also delete any copies of the message from the storage 160.

At operation 408, the backend server 145 may send the notification to the virtual assistant server 140 (e.g., Alexa AVS).

At operation 410, the virtual assistant server 140 may send the notification to the virtual assistant device 105 (e.g., Echo device).

At operation 412, the virtual assistant device 105 may provide the notification to the user 110 in any manner. For example, the virtual assistant device 105 may have a light that turns on and/or blinks in order to indicate the presence of a pending event, such as a received message.

At operation 414, the user 110 may verbally request a virtual assistant frontend (e.g., the virtual assistant application 300 on virtual assistant device 105) to access messages received at an electronic device of user 110 (e.g., received by messaging application 200 on smart phone 130).

At operation 416, the virtual assistant device 105 may transmit the spoken verbal request to a virtual assistant backend (e.g., virtual assistant server 140).

At operation 418, the virtual assistant server 140 may voice process the verbal request (e.g., verbal to text conversion and intent determination) and, upon determining a "messaging" intent, transmit the processed request to a skill backend server 145 that handles the backend processing for a messaging skill of the virtual assistant (e.g., to operate in conjunction with the messaging application 200). A token may be passed (e.g., with the processed request) to the backend server 145 in order to verify user 110 to the messaging application 200 as described below.

At operation 420, the backend server 145 may determine whether data associated with messages received by the smart phone 130 has already been received and stored (e.g., in storage 160 as noted above) and, based on a determination that it has been, proceed directly to operation 432 (as described below). For example, the messaging application 200 may have made the decision on whether to store the received message in local storage (e.g., in smart phone 130) or send the message to backend server 145 in real time, for storage in storage 160, based on notifications having been enabled by user 110 as explained above.

At operation 422, the backend server 145 may transmit the message request of user 110 to the messaging application 200 on the smart phone 130. As noted above, the backend server 145 may use third party server 150 (e.g., Firebase server) to communicate with the messaging application 200 on smart phone 130 regarding the messages that have been requested by user 110. Also as noted above, the Firebase application may provide authentication (e.g., checking token values) to improve the sign-in experience for user 110 in system 100.

At operation 424, the messaging application 200 on the smart phone 130 may send message data associated with received messages to backend server 145 based on receiving the message request from backend server 145.

At operation 426, the backend server 145 may send the message data associated with the received messages to the virtual assistant server 140 (e.g., Alexa AVS) for processing (e.g., text to audio conversion).

At operation 428, the virtual assistant server 140 may send the processed message data to the virtual assistant device 105 (e.g., Echo device).

At operation 430, the virtual assistant device 105 may provide the message data to the user 110 in any manner. For example, the virtual assistant device 105 may play audio based on the processed message data for user 110.

At operation 432, the stored message(s) may be deleted from the backend server 145 (e.g., in storage 160 or smart phone 130) after it is provided to user 110 or after a pre-determined period of time has expired since storage (e.g., 24 hrs). As noted above, the messages may also be deleted before they are read/heard based on an instruction received from the user 110 by the virtual assistant device 105.

Figure 5:
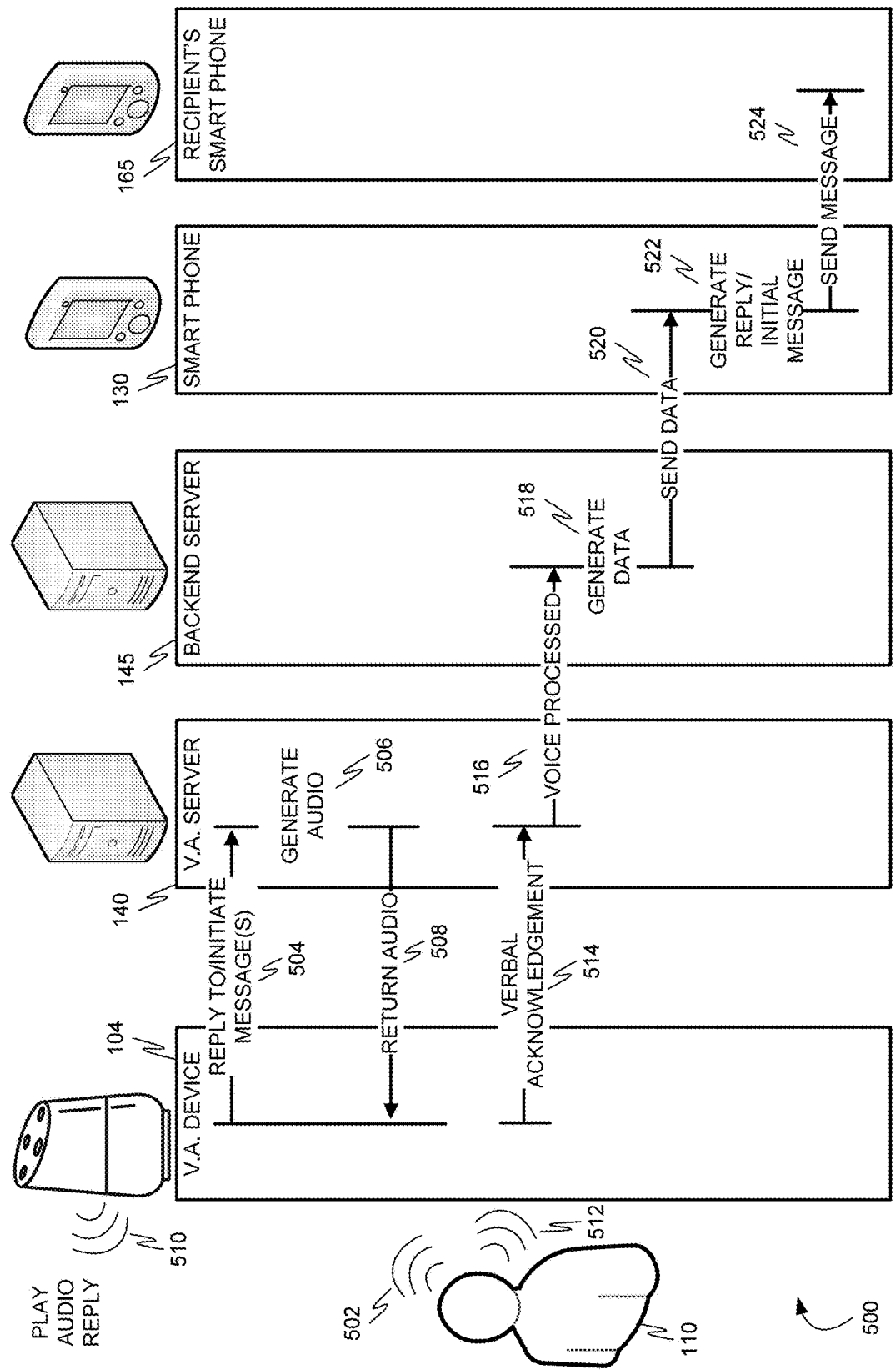
FIG. 5 is a ladder diagram illustrating a method, in accordance with some embodiments, for sending messages over a network by using a virtual assistant.

FIG. 5 is a ladder diagram illustrating a method 500, as used in some embodiments, for sending messages over a network by using a virtual assistant.

A system for replying to messages over a network by using a virtual assistant may resemble system 100 of FIG. 1.

At operation 502, the user 110 may verbally generate an initial message to a contact on smart phone 130 or a reply to at least one message received at the electronic device of user 110 (e.g., received by messaging application 200 on smart phone 130)via the virtual assistant frontend (e.g., the virtual assistant application 300 on virtual assistant device 105).

At operation 504, the virtual assistant device 105 may transmit the spoken verbal initial message or reply to the at least one received message to a virtual assistant backend (e.g., virtual assistant server 140).

At operation 506, the virtual assistant server 140 may voice process the verbal message/reply, wherein the processing may include verbal to text conversion wherein a "message or reply" intent determination is made and then followed by text to audio conversion of the message or reply.

At operation 508, the virtual assistant server 140 may transmit the generated audio message or reply to the virtual assistant device 105.

At operation 510, the virtual assistant device 105 may play the audio message or reply.

At operation 512, the user 110 may verbally acknowledge that the audio message or reply matches the spoken message or reply.

At operation 514, the virtual assistant device 105 may transmit the verbal acknowledgement to the virtual assistant server 140 for voice processing, e.g., verbal to text conversion and determination of a message acknowledgement intent or a reply acknowledgement intent.

At operation 516, the virtual assistant server 140 may transmit the processed acknowledgement message or reply intent (e.g., text) to the skill backend server 145 that handles the backend processing for a messaging skill of the virtual assistant (e.g., to operate in conjunction with the messaging application 200). As noted above, a token may be passed (e.g., with the voice processed request) to the backend server 145 in order to verify user 110 to the messaging application 200.

At operation 518, the backend server 145 may generate data associated with the message or reply, e.g., reply type, reply recipient(s), reply subject, reply body, etc.

At operation 520, the backend server 145 may transmit the message or reply data to the messaging application 200 on smart phone 130. In some embodiments, the backend server 145 may store the message or reply data in a database (e.g., storage 160) for a period of time. As noted above, the backend server 145 may use a third party server (e.g., third party server 150) to interact with the messaging application 200.

At operation 522, the messaging application 200 on smart phone 130 may generate a message or reply based on the received message or reply data. For example, a reply type: e-mail, reply recipient: Bob@gmail.com, reply subject: "dinner" and reply body: "I will meet you at 8 pm".

At operation 524, the messaging application 200 on smart phone 130 may transmit the generated message or reply to an electronic device associated with the recipient (e.g., Bob) of the message or reply (e.g., recipient's smart phone 165).

Methods

Figure 6:
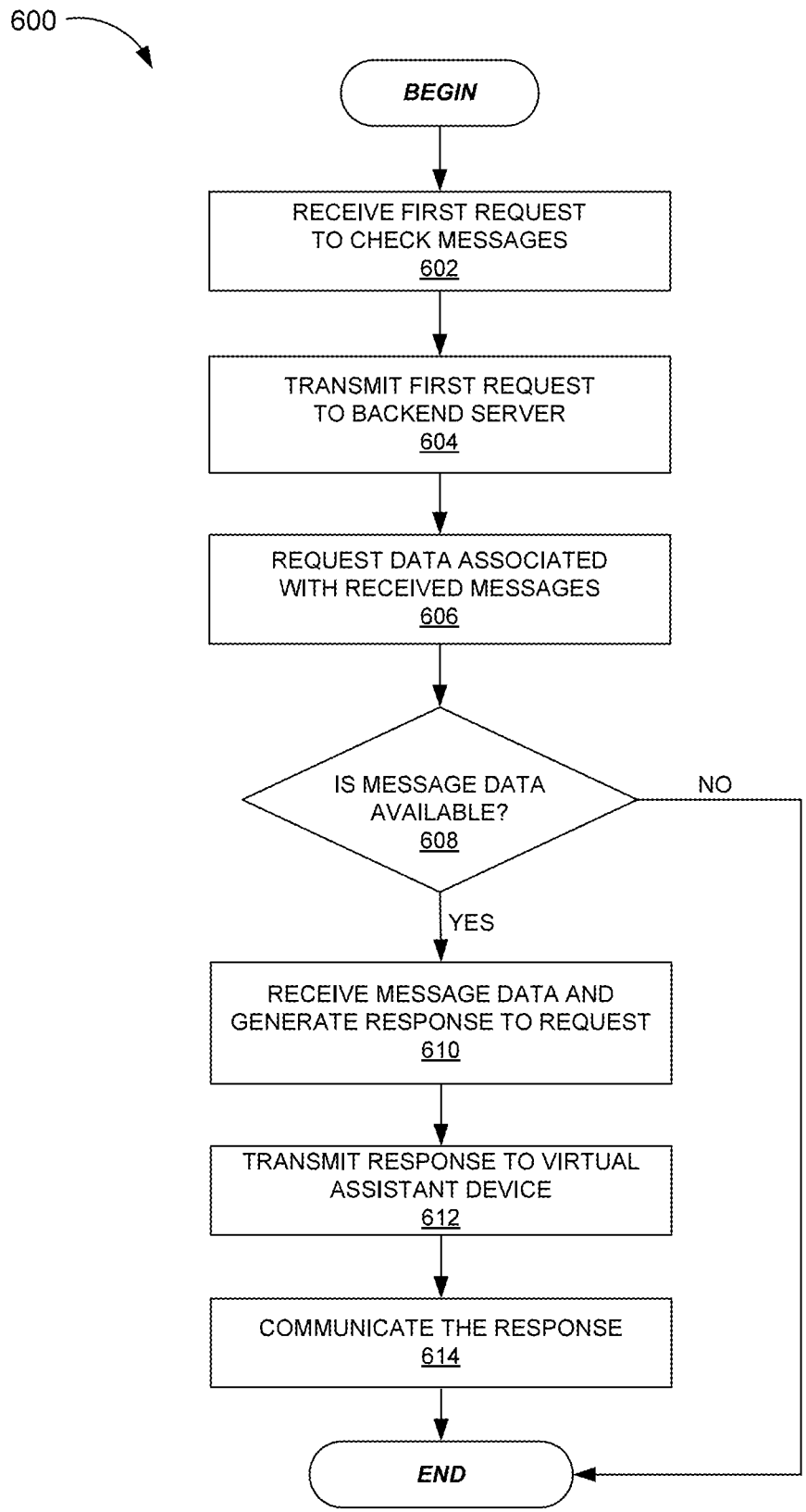
FIG. 6 is a flow diagram illustrating a method, in accordance with some embodiments, for accessing messages over a network by using a virtual assistant.

FIG. 6 is a flow diagram illustrating a method 600, in accordance with embodiments, for accessing messages over a network by using a virtual assistant.

At operation 602, a virtual assistant frontend (e.g., the virtual assistant application 300 on virtual assistant device 106) may receive a first request from the user 10 to check messages received at an electronic device of user 110 (e.g., received by messaging application 200 on smart phone 130).

At operation 604, the first request of user 110 may be transmitted to the backend server 146 (e.g., because a "messages" intent was determined for the first request and backend server 146 hosts a "skill" which facilitates messaging via the virtual assistant frontend (pingloud skill from messageLOUD Inc.).

At operation 606, the backend server 146 may transmit the first request of user 110 to the messaging application 200 on the smart phone 130. As noted above, the backend server 146 may use third party server 160 (e.g., Firebase server) to communicate with the messaging application 200 on smart phone 130 regarding the messages that have been requested by user 110.

At operation 608, the backend server 146 may determine whether any data associated with messages received by the smart phone 130 has been returned from smart phone 130 in response to the first request. The method 600 may end based on a determination that no message data has been returned by smart phone 130.

At operation 610, the backend server 146 may generate a response to the first request based on message data received from messaging application 200 on the smart phone 130.

At operation 612, the backend server 146 may send the generated response to the virtual assistant device 106 (e.g., Echo device).

At operation 614, the virtual assistant device 106 may provide the message data to the user 110 in any manner. For example, the virtual assistant device 106 may play audio based on the generated response for user 110.

Figure 7A:
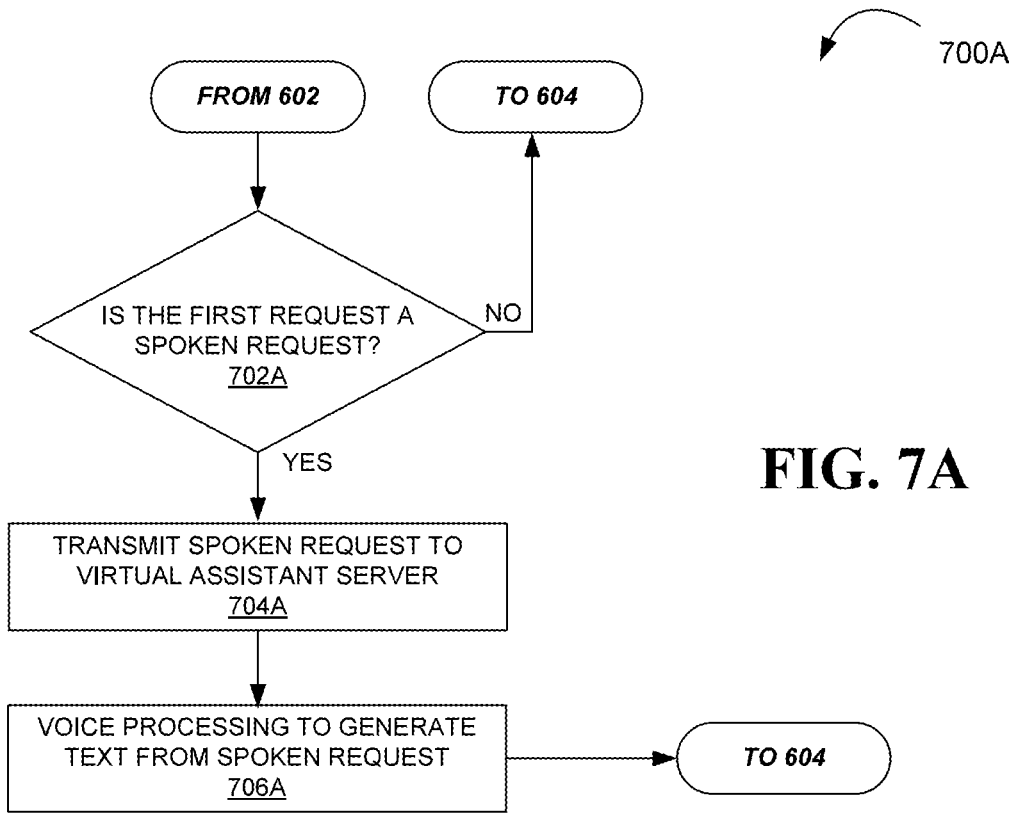
FIGS. 7A and 7B are flow diagrams illustrating example methods for voice processing to access messages over a network by using a virtual assistant.

FIG. 7A is a flow diagram illustrating example method 700A for voice processing to access messages over a network by using a virtual assistant.

At operation 702A (which may follow from operation 602 of method 600 of FIG. 6), the virtual assistant device 106 may determine whether the first request is a spoken verbal request. The method 700A may return to operation 604 of method 600 based on a determination that the first request is not a spoken request.

At operation 704A, the virtual assistant device 106 may transmit the spoken verbal request to a virtual assistant backend (e.g., virtual assistant server 140) based on a determination that the first request is a spoken verbal request.

At operation 706A, the virtual assistant server 140 may voice process the spoken request (e.g., verbal to text conversion and intent determination) and then method 700A may proceed to operation 604 of method 600.

Figure 7B:
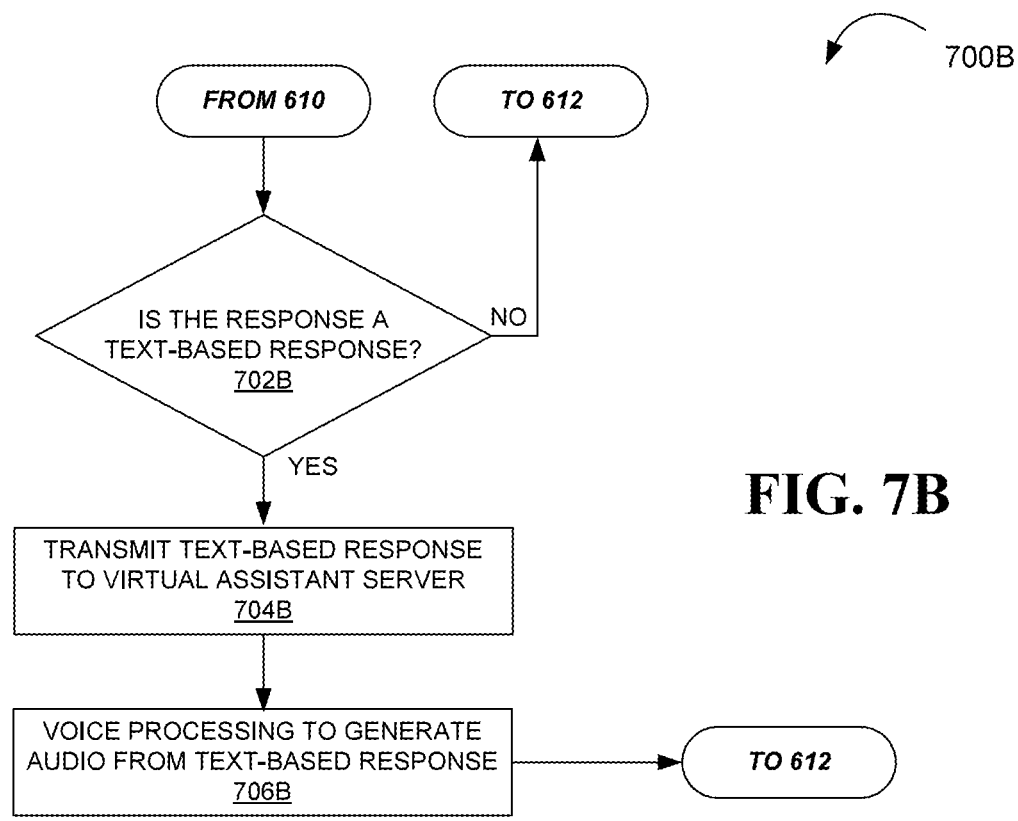

FIG. 7B is a flow diagram illustrating example method 700B for voice processing to access messages over a network by using a virtual assistant.

At operation 702B (which may follow from operation 610 of method 600 of FIG. 6), the virtual assistant device 106 may determine whether the response is a text-based response. The method 700B may return to operation 610 of method 600 based on a determination that the first response is not a text-based response.

At operation 704B, the virtual assistant device 106 may transmit the response to a virtual assistant backend (e.g., virtual assistant server 140) based on a determination that the response is a text-based response.

At operation 706B, the virtual assistant server 140 may voice process the text-based response (e.g., text to audio conversion) and then method 700A may proceed to operation 612 of method 600.

Figure 8:
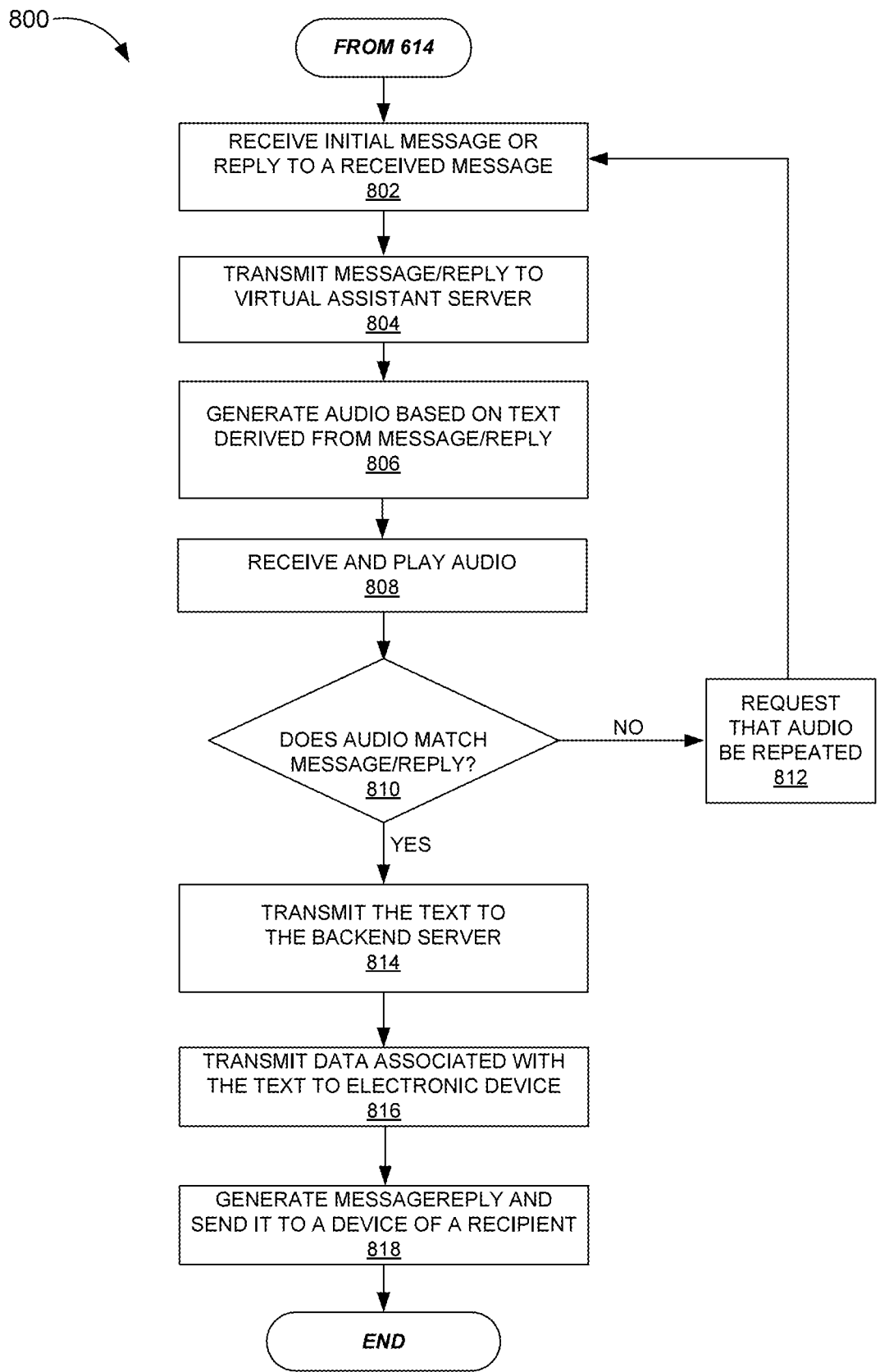
FIG. 8 is a flow diagram illustrating a method, in accordance with some embodiments, for sending messages over a network by using a virtual assistant.

FIG. 8 is a flow diagram illustrating a method 800, consistent with some embodiments, for sending messages by using a virtual assistant.

At operation 802 (which may follow from operation 614 of method 600 of FIG. 6), the virtual assistant frontend (e.g., the virtual assistant application 300 on virtual assistant device 105) may receive an initial message from user 110 to a contact on smart phone 130 or a reply from the user 110 to at least one of the messages received at the electronic device of user 110 (e.g., received by messaging application 200 on smart phone 130).

At operation 804, the virtual assistant device 105 may transmit the spoken verbal initial message or reply to the at least one received message to a virtual assistant backend (e.g., virtual assistant server 140).

At operation 806, the virtual assistant server 140 may voice process the verbal initial message or reply, wherein the processing may include verbal to text conversion, "message or reply" intent determination and text to audio conversion based on the text derived from the spoken initial message or reply.

At operation 808, the virtual assistant device 105 may receive and then play aloud the audio initial message or reply for the user 110 to evaluate.

At operation 810, the user 110 may verbally acknowledge whether the audio reply matches the spoken initial message or reply.

At operation 812, the virtual assistant device 105 may request (e.g., via audio) that the user 110 repeat the initial message or reply based on the user not confirming that the audio initial message or reply matches the spoken initial message or reply. For example, t user 110 may state "No" or "not right" after hearing the audio initial message or reply;

At operation 814, the virtual assistant server 140 may transmit the processed initial message or reply (e.g., text derived from spoken initial message or reply) to the skill backend server 145 that handles the backend processing for a messaging skill of the virtual assistant (e.g., to operate in conjunction with the messaging application 200). As noted above, a token may be passed (e.g., with the voice processed initial message or reply) to the backend server 145 in order to verify user 110 to the messaging application 200.

At operation 816, the backend server 145 may generate data associated with the processed initial message or reply (e.g., reply type, reply recipient(s), reply subject, reply body, etc.) and transmit the initial message or reply data to the messaging application 200 on smart phone 130. In some embodiments, the backend server 145 may store the initial message or reply data in a database (e.g., storage 160) for a period of time. As noted above, the backend server 145 may use a third party server (e.g., third party server 150) to interact with the messaging application 200 on smart phone 130.

At operation 818, the messaging application 200 on smart phone 130 may generate an initial message or reply message based on the received initial message or reply data (e.g., a reply type: e-mail, reply recipient: Bob@gmail.com, reply subject: "dinner" and reply body: "I will meet you at 8 pm") and transmit the generated initial message or reply message to an electronic device associated with the recipient (e.g., Bob) of the reply or message (e.g., recipient's smart phone 165).

Figure 9:
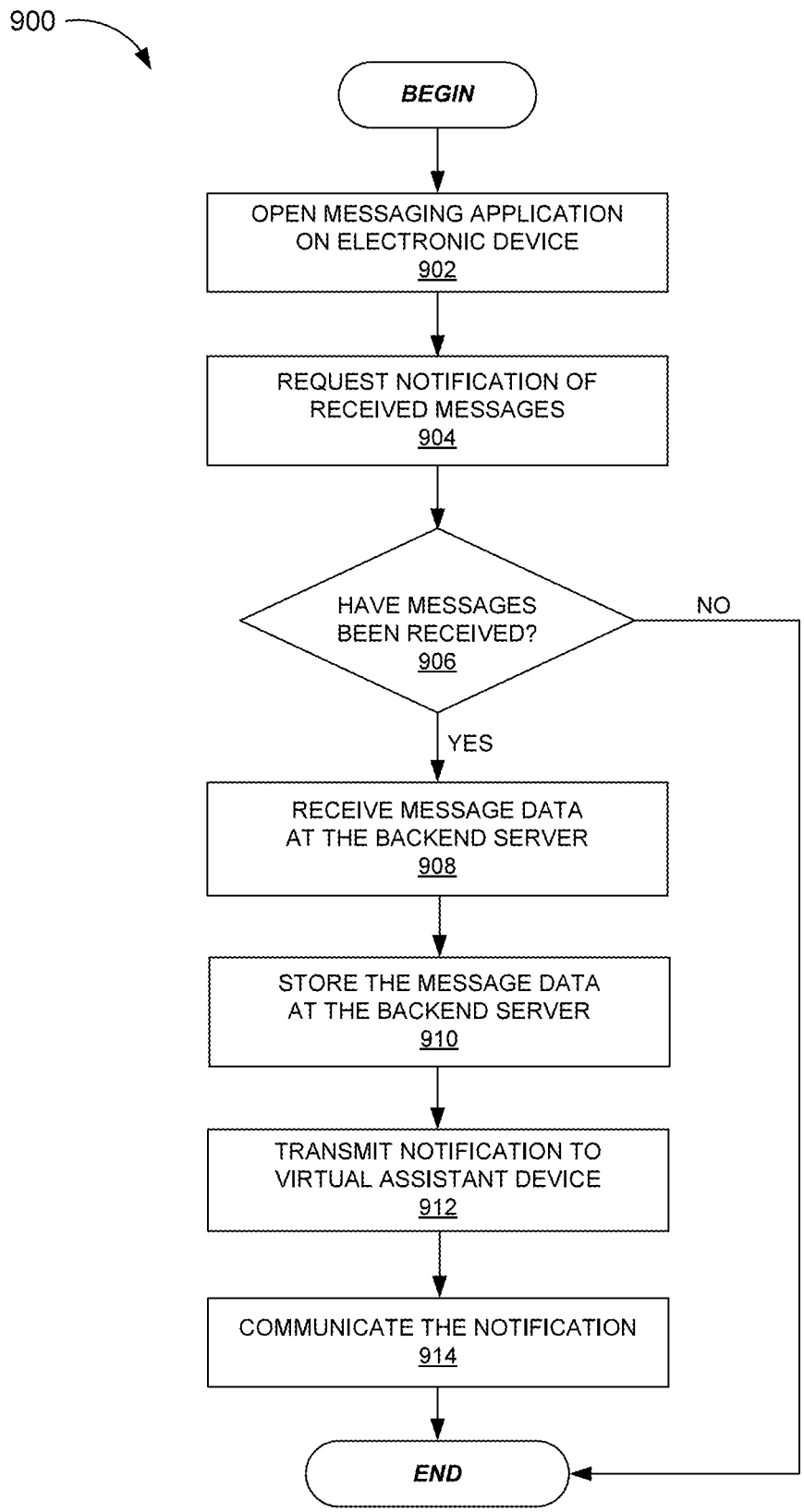
FIG. 9 is a flow diagram illustrating a method, consistent with some embodiments, for requesting message notifications by using a virtual assistant.

FIG. 9 is a flow diagram illustrating a method 900, consistent with some embodiments, for requesting message notifications by using a virtual assistant.

At operation 902, the user 110 may run the messaging application 200 on smart phone 130, e.g., the ping application from messageLOUD Inc.

At operation 904, the user 110 may request to be notified at the virtual assistance device 105 of any messages received at smart phone 130. The user 110 may do this by enabling notifications via a menu option of a UI of the messaging application 200, as described above with respect to FIG. 2.

At operation 906, the backend server 145 may determine whether any notifications regarding messages received by the smart phone 130 has been returned from smart phone 130 in response to the second request. The method 900 may end based on a determination that no notification has been returned by smart phone 130 in response to the second request.

At operation 908, the backend server 145 may receive message data (e.g., including any notifications and/or any messages) from smart phone 130.

At operation 910, the backend server 145 may store the received message data (e.g., in storage 160 as explained above)until they are requested by user 110 or until a specified time period has expired (e.g., 48 hrs).

At operation 912, the backend server 145 may transmit the notification(s) to the virtual assistant device 105 (e.g., Echo device).

At operation 914, the virtual assistant device 105 may provide the notification to the user 110 in any manner. For example, the virtual assistant device 105 may flash a light to indicate that a notification is pending for user 110.

Machine Architecture

Figure 10:
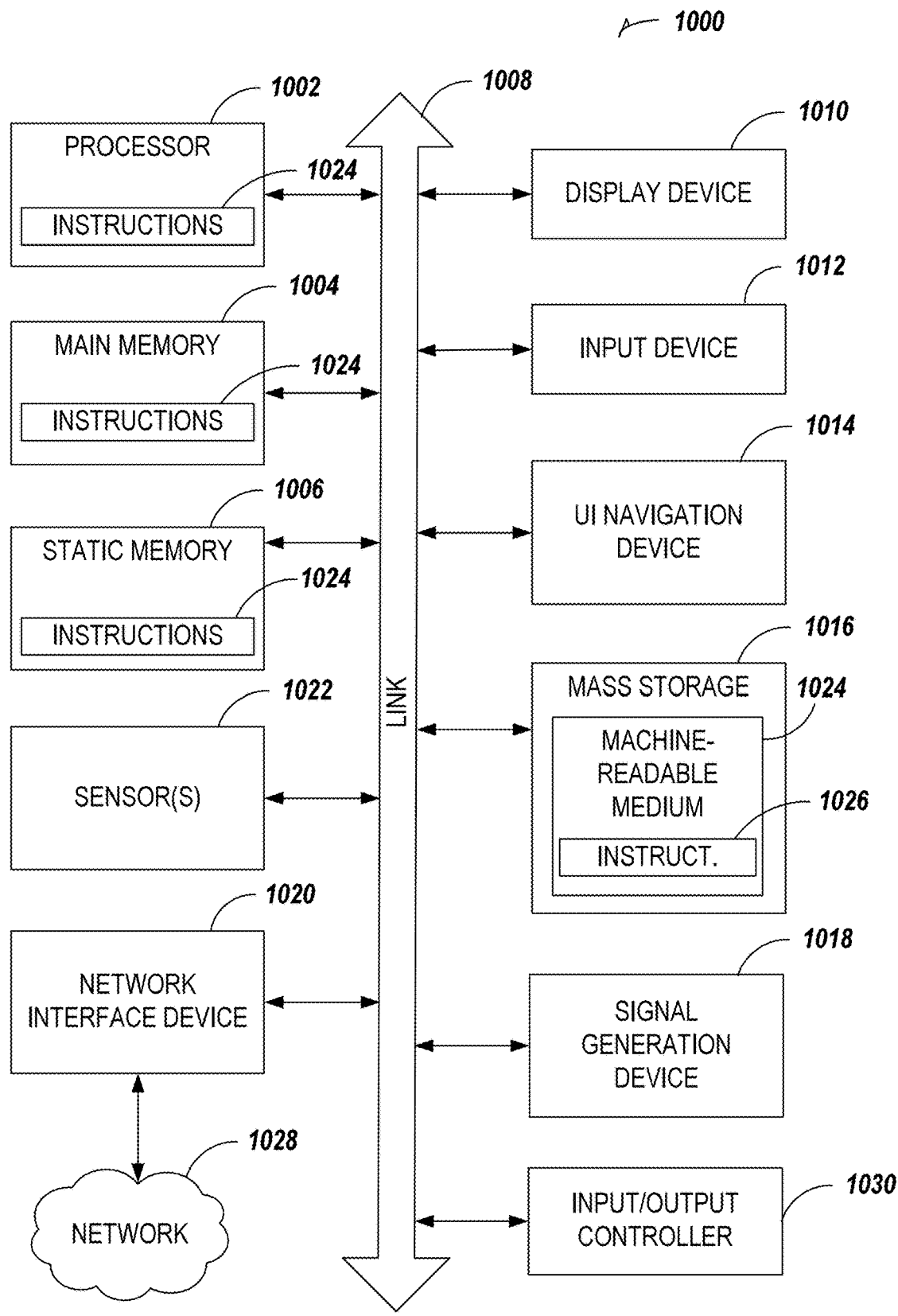
FIG. 10 is a diagrammatic representation of machine, in the example form of a computer system, within which a set of instructions may be executed to cause the machine to perform any of the methodologies discussed herein.

FIG. 10 is a block diagram illustrating a machine in the example form of a computer system 1000, within which a set or sequence of instructions may be executed to cause the machine to perform any one of the methodologies discussed herein, according to an example embodiment.

In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform methods as discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 1000 may further include a video display unit 1010, an alphanumeric input device 1012 (e.g., a keyboard), and a user interface (UM) navigation device 1014 (e.g., a mouse). In one embodiment, the video display unit 1010, input device 1012 and UI navigation device 1014 are incorporated into a touch screen display. The computer system 1000 may additionally include a storage device 1016 (e.g., a drive unit), a signal generation device 1018 (e.g., a speaker), a network interface device 1020, and one or more sensors 1022, such as a global positioning system (GPS) sensor, accelerometer, gyrometer or other sensor.

The storage device 1016 includes a machine-readable medium 1024 on which is stored one or more sets of data structures and instructions 1026 (e.g., software) embodying or utilized by any one or more of the methodologies or functions described herein. The instructions 1026 may also reside, completely or at least partially, within the main memory 1004, static memory 1006, and/or within the processor 1002 during execution thereof by the computer system 1000, with main memory 1004, static memory 1006, and processor 1002 comprising media.

While the machine-readable medium 1024 is illustrated in an example embodiment to be a single medium, the term "machine-readable medium" may include a single medium or multiple media (e.g., a centralized or distributed database, and/or associated caches and servers) that store the one or more instructions 1026. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include volatile or non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1026 may further be transmitted or received over a communications network 1028 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog signals or other intangible medium to facilitate communication of such software.

Example computer system 1000 may also include an input/output controller 1030 to receive input and output requests from the at least one central processor 1002, and then send device-specific control signals to the device they control. The input/output controller 1030 may free the at least one central processor 1002 from having to deal with controlling each separate kind of device.

Appendix

Business Rules/In-Use Commands:

For every command below, add a version with the word 'please' before it. Once Alexa is reading messages the user can say 'stop' to stop reading messages.

Alexa, stop
Alexa, stop reading
Alexa, stop reading messages
When Alexa is reading aloud, the user can say:
Alexa, archive this message
Alexa, archive
Alexa, delete this message
Alexa, delete
Alexa, skip this message
Alexa, skip
Alexa, mark as read
Alexa, mark as unread
Alexa, next message
Alexa, next
Alexa commands:
Do I have any new emails
Do I have any new email
Do I have any new messages
Do I have any new text messages
Do I have any new sms's
Do I have any new WhatsApp messages
Do I have any new WhatsApps
Do I have any new Facebook messages
Do I have any emails
Do I have any email
Do I have any messages Do I have any text messages
Do I have any sms's
Do I have any WhatsApp messages
Do I have any WhatsApps
Do I have any Facebook messages
* The answer to these is: "You have X unread<message type>."
Read my emails
Read my email
Read my messages
Read my texts
Read my WhatsApp messages
Read my WhatsApps
Read my sms's
Read my Facebook messages
* The answer to this is to simply start reading any unread<message types>.
Read emails
Read email
Read messages
Read texts
Read WhatsApp messages
Read WhatsApps
Read sms's
Read Facebook messages
* The answer to this is to simply start reading any unread <message types>.
How many new texts do I have?
How many new sms's do I have?
How many new emails do I have?
How many new Facebook messages do I have?
How many new WhatsApp messages do I have?
How many new WhatsApps do I have?
* The answer to these is: "You have X unread <message type>."

What is claimed is:

1. A computer implemented method, comprising:
receiving, by a virtual assistant program hosted by a virtual assistant device, a first request to check for multiple types of messages received by an electronic device;
transmitting the first request to a backend server for processing;
requesting from a messaging application on the electronic device, by the backend server, stored data associated with the multiple types of messages;
receiving the data associated with the messages and generating a response to the first request based on the received data associated with the messages;
transmitting the response to the virtual assistant program; and
communicating the response by the virtual assistant device.

2. The method of claim 1, wherein the data associated with the messages includes at least one of a number, a source, a date, a time or a body of the messages that have been received by the electronic device.

3. The method of claim 1, wherein the first request is spoken to the virtual assistant device and communicating the response includes playing audio by the virtual assistant device.

4. The method of claim 1, wherein the virtual assistant device comprises at least one of a smart phone, a smart watch, a personal computer, a tablet computer, a vehicle or a home appliance and the multiple types of messages comprise at least two of emails, text messages, voice messages, voicemail or video messages.

5. The method of claim 1, further comprising:
transmitting the first request to a server associated with the virtual assistant program for voice processing, wherein the voice processing includes generating text; and
transmitting the response to the server associated with the virtual assistant program for text processing, wherein the text processing includes generating audio.

6. The method of claim 1, further comprising:
receiving, by the virtual assistant device, a spoken reply to at least one of the messages received by the electronic device;
transmitting the reply to a server associated with the virtual assistant program for voice processing, wherein the voice processing includes generating text based on the reply and generating audio based on the text;
receiving and playing the generated audio by the virtual assistant device;
receiving, by the virtual assistant device, a spoken acknowledgment that the played audio matches the spoken reply; and
transmitting the text to the backend server based on receiving the acknowledgement.

7. The method of claim 6, further comprising:
transmitting to the electronic device, by the backend server, data associated with the text based on the reply;
generating a reply message, by the messaging application on the electronic device, based on the received data associated with the reply; and
transmitting the reply message to a sender of the at least one message.

8. The method of claim 7, wherein the spoken reply to at least one of the messages received by the electronic device comprises an initial message to a contact on the electronic device and transmitting the reply message to a sender of the at least one message comprises transmitting the initial message to the contact on the electronic device.

9. The method of claim 1, further comprising:
transmitting a token to the backend server with the first request; and
using the token to match a user that is logged into the virtual assistant program and the messaging application to a same user account.

10. The method of claim 1, further comprising:
receiving, by the virtual assistant program, a second request to be notified of the electronic device receiving at least one of the multiple types of messages;
instructing, by the backend server, the messaging application on the electronic device to automatically transmit data associated with the at least one message based on receiving the second request from the virtual assistant program;
receiving the at least one message by the electronic device and transmitting data associated with the at least one message to the backend server, storing the data associated with the at least one message;
transmitting a notification to the virtual assistant program based on receiving the data associated with the at least one message; and
communicating the notification by the virtual assistant device.

11. The method of claim 10, further comprising:
generating the response to the first request based on the stored data; and
at least one of deleting the stored data based on the communication of the response or deleting the stored data based on a specified time period.

12. The method of claim 1, further comprising:
receiving a deletion request for unread messages on the electronic device;
transmitting the deletion request to the backend server for processing;
requesting, by the backend server, that the messaging application on the electronic device delete data associated with the unread messages; and
deleting data associated with the unread messages by the electronic device.

13. A system for messaging, comprising:
a virtual assistant device to:
  receive a first request to check for multiple types of messages received by an electronic device; and
  transmit the first request to a backend server for processing;
the backend server to:
  request stored data associated with the multiple types of messages from a messaging application on the electronic device;
  receive the data associated with the messages;
  generate a response to the first request based on the received data; and
  transmit the response to the virtual assistant device; and
the virtual assistant device to communicate the response.

14. The system of claim 13, further comprising:
the virtual assistant device to:
  receive a spoken reply to at least one of the messages received by the electronic device;
  transmit the reply to a server associated with the virtual assistant device for voice processing, wherein the voice processing includes generating text based on the reply and generating audio based on the text;
  receive and play the generated audio;
  receive a spoken acknowledgment that the played audio matches the spoken reply; and
  transmit the text to the backend server based on receiving the acknowledgement.

15. The system of claim 14, further comprising:
the backend server to:
  transmit data associated with the text to the electronic device; and
It messaging application on the electronic device to:
  generate a reply message based on the data associated with the text; and
  transmit the reply message to a sender of the at least one message.

16. The system of claim 13, further comprising:
the virtual assistant device to receive a second request to be notified of the electronic device receiving at least one of the multiple types of messages;
the backend server to instruct the messaging application on the electronic device to automatically transmit data associated with the at least one received message based on receiving the second request from the virtual assistant device;
the electronic device to receive the at least one message and automatically transmit data associated with the at least one message to the backend server;
the backend server to store the data associated with the at least one message and transmit a notification to the virtual assistant device based on receiving the data associated with the at least one message; and
the virtual assistant device to communicate the notification.

17. A non-transitory computer readable medium (CRM) storing instructions which, when executed, cause one or more processors to perform operations, comprising:
receiving, by a virtual assistant program hosted by a virtual assistant device, a first request to check for multiple type of messages received by an electronic device;
transmitting the first request to a backend server for processing;
requesting from a messaging application on the electronic device, by the backend server, stored data associated with the multiple ty of messages;
receiving the requested data and generating a response to the first request;
transmitting the response to the virtual assistant program; and
communicating the response by the virtual assistant device.

18. The CRM of claim 17, further comprising instructions which, when executed, cause the processors to perform operations, comprising:
receiving, by the virtual assistant device, a spoken reply to at least one of the messages received by the electronic device;
transmitting the reply to a server associated with the virtual assistant program for voice processing, wherein the voice processing includes generating text based on the reply and generating audio based on the text;
receiving and playing the generated audio by the virtual assistant device;
receiving, by the virtual assistant device, a spoken acknowledgment that the played audio matches the spoken reply; and
transmitting the text to the backend server based on receiving the acknowledgement.

19. The CRM of claim 18, further comprising instructions which, when executed, cause the processors to perform operations, comprising:
transmitting to the electronic device, by the backend server, data associated with the text based on the reply;
generating a reply message, by h messaging application on the electronic device, based on the received data associated with the reply; and
transmitting the reply message to a sender of the at least one message.

20. The CRM of claim 17, further comprising instructions which, when executed, cause the processors to perform operations, comprising:
receiving, by the virtual assistant program, a second request to be notified of the electronic device receiving at least one of the multiple types of messages;
instructing, by the backend server, the messaging application on the electronic device to automatically transmit data associated with the at least one received message based on receiving the second request from the virtual assistant program;
receiving the at least one message by the electronic device and automatically transmitting data associated with the at least one message to the server;
storing the data associated with the at least one message;
transmitting a notification to the virtual assistant program based on receiving the data associated with the first message; and
communicating the notification by the virtual assistant device.

* * * * *